UNITED STATES PATENT OFFICE 2,587,002

ANTHRAQUINONE DYESTUFFS

George W. Seymour, Cumberland, Md., and Victor S. Salvin, Summit, N. J., assignors to Celanese Corporation of America, a corporation of Delaware No Drawing. Application April 22, 1947,
Serial No. 743,209

10 Claims. (Cl. 260—378)

This invention relates to anthraquinone dyestuffs and relates more particularly to certain novel anthraquinone dyestuffs suitable for dyeing cellulose acetate or other organic derivative of cellulose textile materials in valuable neutral blue, reddish-blue and greenish-blue shades.

An object of this invention is the production of novel anthraquinone dyestuffs having an improved affinity for cellulose acetate or other organic derivative of cellulose textile materials and dyeing said materials in level neutral blue, reddish-blue and greenish-blue shades fast to light and highly resistant to washing and acid-fading.

Other objects of this invention will appear from the following detailed description.

Dyed textile materials which are commercially acceptable must not only be highly resistant to the deleterious effects of washing, exposure to sunlight and the like, but must also be resistant to the harmful effects of atmospheric acid gases thereon. In the case of many anthraquinone dyestuffs dyeing cellulose acetate or other organic derivative of cellulose textile materials in blue shades, these atmospheric gases cause the dyed materials to fade noticeably and to assume a reddish cast, or even to fade to a pink color on prolonged exposure. Dyestuffs which are prone to fade in this way are highly undesirable. The provision of anthraquinone dyestuffs suitable for dyeing cellulose acetate or other organic derivative of cellulose textile materials in blue shades which are of desirable fastness properties not only with respect to light and washing but to acid-fading as well, has, therefore, long been an important goal in the dyeing art.

We have now found that the novel anthraquinone dyestuffs of the following general formula

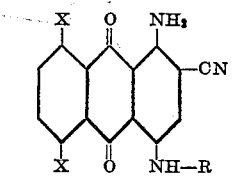

wherein one substituent X is hydrogen and the other substituent X is a halogen, amino or alkyl-amino group, and R is hydrogen or an alkyl, hydroaryl, aralkyl or aryl group yield valuable neutral blue, reddish-blue and greenish-blue colorations on cellulose acetate or other organic derivative of cellulose materials which are highly resistant to washing, light and acid-fading. As examples of suitable substituents, X may be a halogen group such as a chloro- or brom-group or any alkyl-amino group wherein the alkyl radical may be a methyl, ethyl, propyl, butyl, amyl, octyl, decyl, dodecyl or stearyl group, while R may be an alkyl group such as, for example, methyl, ethyl, propyl, butyl, amyl, octyl, decyl, dodecyl or stearyl, a hydroaryl group such as cyclohexyl, tetrahydronaphthyl or decahydronaphthyl, an aralkyl group such as benzyl, or an aryl group such as phenyl, naphthyl, tolyl, or other substituted aryl group.

The novel dyestuffs of our invention may be prepared commercially by first preparing the desired intermediates. The intermediates may be obtained by a process which comprises the steps of nitrating 1-sulfo-anthraquinone to form 1-nitro-5 or 8-sulfo-anthraquinone, reacting the same with sodium chlorate and hydrochloric acid to form the 1-nitro-5 or 8-chlor-anthraquinone, reducing the nitro group to an amino group, sulfonating to yield 1-amino-2-sulfo-5 or 8-chlor-anthraquinone, and brominating the 1-amino-2-sulfo-5 or 8-chlor-anthraquinone to form 1-amino-2-sulfo-4-brom-5 or 8-chlor-anthraquinone. The latter may then be reacted with the desired amine or with p-toluenesulfonamide followed by hydrolysis, to replace the 4-brom group and, on reaction of the 1-amino-2-sulfo-4-amino- (or substituted amino)-5 or 8-chlor-anthraquinone thus obtained with potassium cyanide there is obtained 1-amino-2-cyano-4-amino-(or substituted amino)-5 or 8-chlor-anthraquinone.

As examples of amines which may be employed in replacing the 4-brom group there may be mentioned methylamine, ethylamine, propylamine, butylamine, ethanolamine, butanolamine, amylamine, octylamine, cyclohexylamine, benzylamine, aniline, toluidine, amino-ethylbenzene, amino-acetophenone, amino-cresol, amino-phenol, sulfanilamide, p-anisidine, p-phenetidine, naphthylamine, and the like.

The preparation of anthraquinone dyestuffs containing a 5 or 8-amino or 5 or 8-alkyl-amino group may be effected by reacting the 1-amino-2-sulfo-4-amino-(or substituted amino)- 5 or 8-chlor-anthraquinone obtained as described above, with p-toluenesulfonamide or a p-toluene-alkyl-sulfonamide such as p-toluene-methyl-sulfonamide or p-toluene-butyl-sulfonamide under suitable conditions whereby the 5 or 8-chlor group is replaced by the p-toluenesulfonamide or p-toluene-alkyl-sufonamide group. On hydrolysis, the corresponding 5 or 8-amino or 5 or 8-alkyl-amino compound is obtained.

In order further to illustrate our invention, but without being limited thereto, the following examples are given:

Example I 5 parts by weight of 1-amino-2-sulfo-4-brom-5-chlor-anthraquinone are dissolved in 100 parts by weight of water. To the solution obtained are added 0.1 parts of copper acetate, 4 parts of p-toluenesulfonamide, and 3 parts of sodium carbonate. The solution is refluxed for 5 hours, the suspension cooled and the precipitated 1-amino-2-sulfo-4-p - toluenesulfonamide-5 - chlor - anthraquinone filtered off. The toluenesulfonamido derivative is dried and then hydrolyzed by warming in concentrated sulfuric acid for one hour at 60° C. The sulfuric acid solution is poured on to ice and water and the 1-amino-2-sulfo-4-amino-5-chlor-anthraquinone formed is salted out.

5 parts by weight of the above 1-amino-2-sulfo-4-amino-5-chlor-anthraquinone are dissolved in 250 parts by weight of water containing 5 parts by weight of potassium cyanide. The solution is heated to 85° C. for 5 hours and 1-amino-2-cyano-4-amino - 5 - chlor - anthraquinone precipitates from solution as it is formed.

This dyestuff dyes cellulose acetate textile materials normal blue shades and is of "excellent affinity" for said materials. The dyed cellulose acetate materials exhibit a resistance to gas fading of 0.7 units in accordance with the standard A. A. T. C. C. test and are also highly resistant to light, washing, dry bleeding and to perspiration.

Example II 7 parts by weight of 1-amino-2-sulfo-4-amino-5-chlor-anthraquinone and 5 parts by weight of p-toluenesulfonamide are dissolved in 60 parts by weight of nitrobenzene, and 6 parts of potassium carbonate and 0.1 part of copper acetate are added thereto. The mixture is stirred and heated under reflux for 2½ hours. After cooling and decantation, the tarry product which separates out is ground with ethyl ether. The solid matter remaining is thoroughly boiled out with water, filtered, the combined filtrates acidified slightly with hydrochloric acid and the precipitate formed on acidification is filtered from the remaining solution. The precipitate, which comprises the toluenesulfonamide reaction product, is hydrolyzed on a water bath employing about 45 parts by weight of concentrated sulfuric acid and, on hydrolysis, 1-amino-2-sulfo-4,5-dimamino - anthraquinone is obtained.

4 parts by weight of the above compound are dissolved in 300 parts by weight of water containing 6 parts by weight of potassium cyanide and the solution obtained heated for about 4 hours at 85° C. The 1-amino-2-cyano-4,5-diamino-anthraquinone thus formed precipitates from solution and is filtered off and dried. This dyestuff dyes cellulose acetate textile materials in neutral blue shades and exhibits "excellent affinity" therefor. The dyed cellulose acetate textile material is highly resistant to light and to washing and exhibits a resistance of 0.8 units when subjected to the standard A. A. T. C. C. test to determine acid-fading resistance.

Example III 8 parts by weight of 1-amino-2-sulfo-4-brom-5-chlor-anthraquinone are dissolved in 200 parts of water containing 0.1 parts by weight of copper acetate. 15 parts by weight of butylamine are added and the solution heated to 80° C. until maximum blueness is developed. The 1-amino-2-sulfo-4-butylamine - 5 - chlor - anthraquinone formed is salted out from solution by the addition of 4% sodium chloride, redissolved in water and reprecipitated therefrom in purified form by the addition thereto of a 2% hydrochloric acid solution containing 2% sodium chloride.

5 parts by weight of the 1-amino-2-sulfo-4-butylamino-5-chlor-anthraquinone are dissolved in 300 parts by weight of water containing 6 parts by weight of potassium cyanide and the solution heated to 85° C. for 4 hours. The 1-amino-2-cyano-4-butylamino-5-chlor-anthraquinone precipitates as formed and is then filtered and dried. This dyestuff dyes cellulose acetate textile materials in green-blue shades fast to light, washing and acid-fading. Their resistance to acid-fading is 0.7 units according to the standard A. A. T. C. C. test.

Example IV 12 parts by weight of 1-amino-2-sulfo-4-butylamino-5-chloranthraquinone and 10 parts by weight of p-toluenesulfonamide are dissolved in 120 parts by weight of nitrobenzene and 6.9 parts of potassium carbonate and 0.1 parts by weight of copper acetate added thereto. The solution is stirred and heated slowly under reflux. At 135° C. the solution turned purple. The temperature is raised slowly to 155° C. over 1½ hours and, after 2 hours, the purple color disappears. The reaction mixture is cooled with stirring, the precipitate filtered and boiled repeatedly with water until the washings are colorless. On acidification with hydrochloric acid the combined filtrates gave a precipitate which is 1-amino-2-sulfo - 4 - butylamino-5-p-toluenesulfonamido-anthraquinone-hydrochloride.

4 parts by weight of the latter are hydrolyzed with about 27 parts by weight of concentrated sulfuric acid at about 85° C. for about 3½ hours. The reaction mixture is cooled and drowned in water and the highly insoluble 1-amino-2-sulfo-4-butylamino-5-amino-anthraquinone is precipitated. The latter is washed thoroughly with water, dissolved in dilute ammonia, the solution filtered and, on acidification, purified 1-amino-2-sulfo-4-butylamino-5-amino - anthroquinone is obtained.

4 parts by weight of the sulfo-compound are dissolved in 200 parts by weight of water containing 4 parts by weight of potassium cyanide and heated for 4 hours with stirring at 85° C. The 1-amino - 2 - cyano-4-butylamino-5-amino-anthraquinone precipitates as formed. The precipitate is filtered off and washed. This dyestuff dyes cellulose acetate textile materials in greenish-blue shades of excellent fastness to light, washing and acid-fading, having a resistance of 0.7 units in accordance with the A. A. T. C. C. test.

Example V 7 parts by weight 1-amino-2-sulfo-4-amino-5-chlor-anthraquinone and 5 parts by weight p-toluene-methyl-sulfonamide are dissolved in 60 parts by weight nitrobenzene and 6 parts by weight of potassium carbonate and 0.1 part by weight copper acetate are added. The mixture is stirred at 160° C. for 3 hours. The reaction mixture is cooled with stirring, the precipitate which forms filtered, and extracted with water. On acidification with hydrochloric acid, the extracts give a precipitate which is the hydrochloride of 1 - amino-2-sulfo-4-amino-5-p-toluene-sulfonmethylamido-anthraquinone. 5 parts by weight of the latter compound are hydrolyzed with 25 parts by weight of concentrated sulfuric acid at 85° C. for 3 hours. The reaction mixture is cooled and drowned in water, whereupon the 1-amino - 2 - sulfo-4-amino-5-methylamino-anthraquinone is precipitated. It is isolated by filtration.

4 parts by weight of the sulfo-compound thus obtained are dissolved in 200 parts by weight of water containing 4 parts by weight of potassium carbonate and heated for 4 hours with stirring at 85° C. The dyestuff 1-amino-2-cyano-4-amino-5 - methylamino-anthraquinone precipitates as formed. The precipitate is filtered off and washed. This dyestuff dyes cellulose acetate textile material in blue shades of excellent fastness to light, washing, and acid-fading, having a resistance to acid-fading of 1.8 units in accordance with the standard A. A. T. C. C. test.

*Example VI*

12 parts by weight of 1-amino-2-sulfo-4-butylamino-5-chlor-anthraquinone and 11 parts by weight of p-toluenesulfonmethylamide are dissolved in 120 parts by weight of nitrobenzene and 6.9 parts by weight of potassium carbonate and 0.1 parts by weight of copper acetate added thereto. The solution is stirred and heated slowly under reflux. The temperature is raised slowly to 155° C. over 1½ hours and maintained at this temperature for a further 2 hours. The reaction mixture is cooled and the precipitate filtered and extracted with hot water. On acidification of the extract with hydrochloric acid, 1-amino-2-sulfo-4-butylamino - 5 - p-toluenesulfonmethylamide-anthraquinone precipitates as the hydrochloride. It is filtered off and dried. 4 parts by weight of the latter compound are hydrolyzed with about 25 parts by weight of concentrated sulfuric acid at about 85° C. for about 4 hours. The reaction mixture is cooled and drowned in water and the highly insoluble 1-amino-2-sulfo-4-butylamino-5-methylamino-anthraquinone is precipitated and isolated by filtration.

4 parts by weight of the above sulfo-compound are dissolved in 200 parts by weight of water containing 4 parts by weight of potassium cyanide and heated for 4 hours with stirring at 85° C. The desired 1-amino-2-cyano-4-butylamino-5-methylamino - anthraquinone precipitates as formed. The precipitate is filtered off and washed. This dyestuff dyes cellulose acetate textile materials in greenish-blue shades of excellent fastness to light, washing, and acid-fading, having a resistance of 1.8 units in accordance with the A. A. T. C. C. test.

*Example VII*

12 parts by weight of 1-amino-2-sulfo-4-butylamino-8-chlor-anthraquinone and 11 parts by weight of p-toluenesulfonmethylamide are dissolved in 120 parts by weight of nitrobenzene and 6.9 parts by weight of potassium carbonate and 0.1 part by weight of copper acetate added thereto. The solution is stirred and heated slowly under reflux. The temperature is raised slowly to 155° C. over 1½ hours and maintained at this temperature for a further 2 hours. The reaction mixture is cooled and the precipitate filtered and extracted with hot water. On acidification of the extract with hydrochloric acid, 1-amino-2-sulfo-4-butylamino-8- p -toluenesulfonmethylamido-anthraquinone precipitates as the hydrochloride. It is filtered off and dried. 4 parts by weight of the latter compound are hydrolyzed with about 25 parts by weight of concentrated sulfuric acid at about 85° C. for about 4 hours. The reaction mixture is cooled and drowned in water and the highly insoluble 1-amino-2-sulfo -4- butylamino - 8 - methylamino-anthraquinone is precipitated and isolated by filtration.

4 parts by weight of the above sulfo-compound are dissolved in 200 parts by weight of water containing 4 parts by weight of potassium cyanide and heated for 4 hours with stirring at 85° C. The desired 1-amino-2-cyano - 4 - butylamino-8-methylamino - anthraquinone precipitates as formed. The precipitate is filtered off and washed. This dyestuff dyes cellulose acetate textile materials in greenish-blue shades of excellent fastness to light, washing, and acid-fading, having a resistance of 1.8 units in accordance with the A. A. T. C. C. test.

While the novel dyestuffs of our invention have been more particularly described in connection with the dyeing of cellulose acetate textile materials they may also be employed for the dyeing of other textile materials having a basis of an organic derivative of cellulose. Examples of other organic derivatives of cellulose are cellulose esters, such as cellulose propionate, cellulose butyrate, cellulose acetate-propionate, cellulose acetate-butyrate and cellulose ethers such as ethyl cellulose and benzyl cellulose. Other textile materials may also be dyed with said dyestuffs such as, for example, textile materials having a basis of a synthetic linear polyamide condensation product.

It is to be understood that the foregoing detailed description is given merely by way of illustration and that many variations may be made therein without departing from the spirit of our invention.

Having described our inventioin, what we desire to secure by Letters Patent is:

1. Anthraquinone dyestuffs of the following general formula:

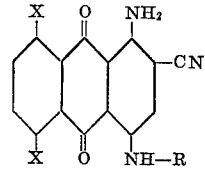

wherein one substituent X is hydrogen and the other substituent X is a member of the group consisting of halogen, amino and alkyl-amino groups and R is a member of the group consisting of hydrogen, alkyl, hydroaryl, aralkyl and aryl groups.

2. The novel dyestuff, 1-amino-2-cyano-4-amino-5-chloranthraquinone.

3. The novel dyestuff, 1-amino-2-cyano-4-butylamino-5-chlor-anthraquinone.

4. The novel dyestuff, 1-amino-2-cyano-4,5-diamino-anthraquinone.

5. The novel dyestuff, 1-amino-2-cyano-4-butylamino-5-amino-anthraquinone.

6. The novel dyestuff, 1-amino-2-cyano-4-amino-5-methylamino-anthraquinone.

7. Process for the production of anthraquinone dyestuffs of the following general formula:

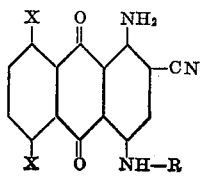

wherein one substituent X is hydrogen and the other substituent X is a member of the group consisting of halogen, amino and alkyl-amino groups and R is a member of the group consisting of hydrogen, alkyl, hydroaryl, alkaryl and aryl groups, which comprises reacting 1-amino-2-sulfo-4-brom - 5 - chlor - anthraquinone with a member of the group consisting of p-toluene-sulfonamide, p-toluene-alkyl-sulfonamide and an organic amine of the formula R—NH₂ whereby at least the 4-brom group is replaced by an amino group and then reacting the resulting amino-anthraquinone compound with potassium cyanide.

8. Process for the production of 1-amino-2-cyano-4-amino -5- chlor - anthraquinone, which comprises reacting 1-amino-2-sulfo-4-brom-5-chlor-anthraquinone with p-toluenesulfonamide, hydrolyzing the 4-p-toluenesulfonamido compound formed, and then reacting the amide hydrolysis product with potassium cyanide.

9. Process for the production of 1-amino-2-cyano-4,5-diamino-anthraquinone, which comprises reacting 1-amino -2- sulfo -4- amino -5-chlor-anthraquinone with p - toluenesulfonamide, hydrolyzing the 5-p-toluenesulfonamido compound formed, and then reacting the amine hydrolysis product obtained with potassium cyanide.

10. Process for the production of 1-amino-2-cyano -4- butylamino - 5 - chlor - anthraquinone, which comprises reacting 1-amino-2-sulfo-4-brom-5-chlor-anthraquinone with butylamine to form 1- amino -2- sulfo -4- butylamino -5- chlor-anthraquinone, and then reacting the latter with potassium cyanide whereby 1-amino-2-cyano-4-butylamino-5-chlor-anthraquinone is obtained.

GEORGE W. SEYMOUR.
VICTOR S. SALVIN.

REFERENCES CITED

The following references are of record in the file of this patent:

UNITED STATES PATENTS

| Number | Name | Date |
|---|---|---|
| 1,938,029 | Kugel | Dec. 5, 1933 |
| 2,335,680 | Klein | Nov. 30, 1943 |
| 2,359,381 | Perkins et al. | Oct. 3, 1944 |
| 2,445,007 | Seymour et al. | July 13, 1948 |

FOREIGN PATENTS

| Number | Country | Date |
|---|---|---|
| 165,139 | Germany | Nov. 10, 1905 |